(12) United States Patent
Tuns et al.

(10) Patent No.: US 11,851,811 B2
(45) Date of Patent: Dec. 26, 2023

(54) ARTIFICIAL LEATHER PRODUCT AND PROCESS FOR PRODUCING SAME

(71) Applicant: KVADRAT A/S, Ebeltoft (DK)

(72) Inventors: Dea Marcela Tuns, Ebeltoft (DK); Ronni Aakermann Johansen, Ebeltoft (DK)

(73) Assignee: KVADRAT A/S, Ebeltoft (DK)

( * ) Notice: Subject to any disclaimer, the term of this patent is extended or adjusted under 35 U.S.C. 154(b) by 0 days.

(21) Appl. No.: 17/622,606

(22) PCT Filed: Apr. 1, 2020

(86) PCT No.: PCT/EP2020/059312
§ 371 (c)(1),
(2) Date: Dec. 23, 2021

(87) PCT Pub. No.: WO2021/001070
PCT Pub. Date: Jan. 7, 2021

(65) Prior Publication Data
US 2022/0205169 A1    Jun. 30, 2022

(30) Foreign Application Priority Data
Jul. 2, 2019  (EP) ..................... 19183946

(51) Int. Cl.
*D06N 3/00*  (2006.01)
*D06N 3/12*  (2006.01)
*D06N 3/14*  (2006.01)

(52) U.S. Cl.
CPC ........... *D06N 3/0011* (2013.01); *D06N 3/123* (2013.01); *D06N 3/143* (2013.01); *D06N 2201/045* (2013.01); *D06N 2211/28* (2013.01)

(58) Field of Classification Search
CPC ...... D06N 3/0011; D06N 3/123; D06N 3/143; D06N 3/145; D06N 2201/045; D06N 2211/28; D04H 1/425; D04H 3/015
See application file for complete search history.

(56) References Cited

U.S. PATENT DOCUMENTS 3,846,156 A * 11/1974 Seibert ................. D06N 3/0052
                                                     427/354
6,784,127 B1 * 8/2004 Yamakawa .......... D06N 3/0027
                                                     442/104
(Continued)

FOREIGN PATENT DOCUMENTS

CN      206109852 U  *  4/2017
CN      206109852 U     4/2017
(Continued)

OTHER PUBLICATIONS

"CN206109852_Machine Translation" is a machine translation of CN-206109852-U. (Year: 2017).*

*Primary Examiner* — Larissa Rowe Emrich
(74) *Attorney, Agent, or Firm* — NGUYEN TARBET LLC

(57) ABSTRACT

This invention relates to an artificial leather having a laminated structure and a process for producing such product. The artificial leather comprises a non-woven matt formed from bast fibres, more particularly fibres obtained from hemp plants. The fibres in the non-woven matt are impregnated with a polymer, such as a polyester or polyurethane. The artificial leather includes the non-woven matt as a discrete bottom layer in a laminated structure also comprising a discrete intermediate layer of a binder material and a discrete top layer of a polymer coating material.

15 Claims, 3 Drawing Sheets

(56) References Cited

U.S. PATENT DOCUMENTS

Figure 1:
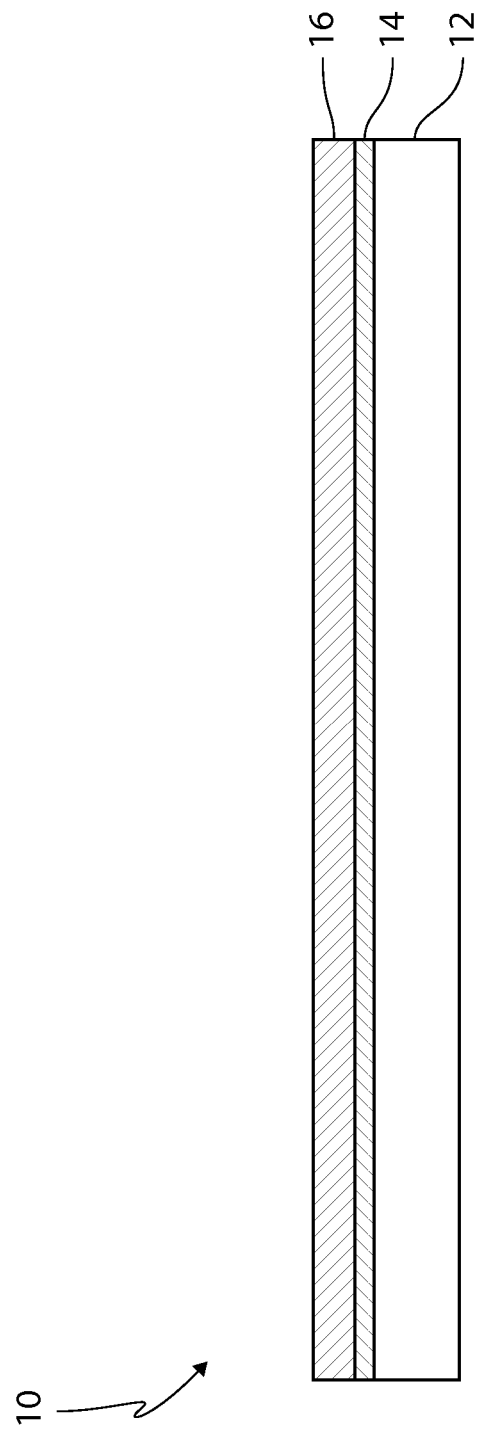

| | | | | |
|---|---|---|---|---|
| 2008/0163469 A1* | 7/2008 | Tanaka | ............ | D04H 1/46 |
| | | | | 28/104 |
| 2013/0149512 A1* | 6/2013 | Hijosa | ............ | D06N 3/0013 |
| | | | | 156/60 |
| 2015/0337496 A1* | 11/2015 | Lee | ............ | D21H 27/004 |
| | | | | 15/104.93 |

FOREIGN PATENT DOCUMENTS

| | | |
|---|---|---|
| CN | 109703124 A | 5/2019 |
| JP | H02145877 A | 6/1990 |

\* cited by examiner

ARTIFICIAL LEATHER PRODUCT AND PROCESS FOR PRODUCING SAME

This invention relates to an artificial leather, i.e. a leather substitute that resembles natural leather or synthetic leather in structure and appearance. The invention relates also to a process for producing an artificial leather, an article such as clothing comprising the artificial leather, and use of the artificial leather in the manufacturing of articles such as clothing, and for instance also furniture, shoes, purses, bags, luggage and linings. In particular, the artificial leather comprises a non-woven matt formed from bast fibres, more particularly fibres obtained from hemp plants. The fibres in the non-woven matt are impregnated with a polymer, such as a polyester or polyurethane (PU). The artificial leather includes the non-woven matt as a discrete bottom layer, i.e. as a distinct or separate bottom layer, in a laminated structure also comprising a discrete intermediate layer of a binder material, such as PU, and a discrete top layer of a PU coating material. The thickness of the bottom layer is greater than the thickness of any of the first intermediate layer or the top layer. The thickness of the top layer is preferably higher than that of the intermediate layer.

Conventional synthetic leather is a highly appealable customer product because of its texture, appearance, malleability, water resistance, and more. This has resulted in a wide range of uses or applications, such as in the production of shoes, handbags, purses etc., however, the production of conventional leather is chemically intensive, normally requiring the use of particularly heavy chemicals in the tanning process. The production of synthetic leather requires use of man-made fibres which are normally petroleum based, and thus exert a significant negative environmental impact.

Hence, different solutions in the form of synthetic leather including in part the use of natural fibres, or artificial leather produced by the use of natural fibres i.e. plant based fibres, such as hemp fibres as raw material, already exists.

EP 2893068 A discloses non-woven fabrics comprised of individualized bast fibres. The non-woven fabric is formed into a laminate by applying a film of a polymer material on the surface of the non-woven fabric.

WO 2010/044761 A1 discloses a process for the production of artificial leather obtained by using an intermediate product acquired by churning water based polyurethane and/or acrylic, latex, dye and other auxiliary chemicals in a foam machinery with the help of air in order to give them a porous structure.

CN 206109852 U discloses a synthetic leather in which hemp fibres are used. The synthetic leather shows distinct layers in the form of a first non-woven hemp fibre layer made of biodegradable hemp fibers and chemically synthetic leather fibers, on top of which a second hydrophilic PU layer is applied. This PU layer is coated with a third hydrophilic PU layer, and finally a fourth hydrophobic PU layer is applied.

EP 2 5766 881 A discloses an artificial leather comprising distinct layers, in which each layer comprises stem fibres and a cured polymer, and where the layers are joined together mechanically by e.g. needle punching. The artificial leather is thus a multiple layered non-woven stack.

The prior art is at least silent about the provision of an artificial leather having a laminated structure where the substrate is a non-woven matt of bast fibres, in particular hemp fibres, without using chemically synthetic leather fibres, and in which the layer of binding material forming an intermediate layer is thinner than a PU coating layer forming the top layer, i.e. in which the top layer is thicker than the intermediate layer.

It is therefore an object of the present invention to provide an artificial leather, which is simpler in its layered structure than prior art artificial leather products.

It is another object of the present invention to provide a process for producing an artificial leather using bast fibres as raw material, which is simpler than prior art processes.

These and other objects are solved by the present invention.

Accordingly, in a first aspect of the invention there is provided an artificial leather having a laminated structure in the form of a plurality of discrete layers, said plurality of layers comprising a bottom layer, an intermediate layer, and a top layer, said bottom layer being a non-woven matt comprising bast fibres impregnated with a polymer for binding and colouring said bast fibres, and said bottom layer defining a bottom layer thickness, said intermediate layer being a layer of a binder material, in which said intermediate layer is in direct connection (i.e. adjacent) with said bottom layer and in direct connection with said top layer for gluing with said top layer, and said intermediate layer defining an intermediate layer thickness, said top layer being a polymer coating and defining a top layer thickness, and wherein said bottom layer thickness is greater than any of said first intermediate layer thickness or said top layer thickness, and said first intermediate layer thickness is different from said top layer thickness.

Preferably, said plurality of layers comprises only a bottom layer, an intermediate layer, and a top layer. That is, the artificial leather has three discrete layers.

Only the bottom layer, which is the substrate, is a non-woven matt.

In an embodiment according to the first aspect, said polymer coating of the top layer is selected acrylic or latex paints, PVC, polyethylene (PE), polypropylene (PP) or polyurethane (PU). Preferably, the polymer coating is PU. As used herein, the term polymer encompasses both polymers and copolymers. As used herein, the term latex means a suspension of polymer microparticles in water.

By providing coating layers (intermediate and top layer) of different thickness, an artificial leather results, which contains the natural functionality and performance of bast fibres, while keeping the appearance and properties of synthetic leather. The bast fibres are carbon dioxide-neutral, meaning that net production of carbon dioxide in the production of such bast fibres is zero or negative. By using bast fibres instead of microfibers, polyester, PVC or other chemically synthetic fibres as is known in the production of synthetic leather, it is now also possible to recycle the product in a more environmentally sound manner, e.g. by bio-degrading it and by re-using it as a new material, and hence enabling to maintain the life cycle by keep using the bast fibres as long as possible. An environmentally friendly alternative to synthetic leather is thus provided.

In an embodiment according to the first aspect, said bast fibres of said bottom layer are hemp fibres and impregnated with a polymer selected from polyester or PU. The non-woven matt thus contains fibres which are impregnated with e.g. PU for providing colour and cohesion of the fibres.

In an embodiment according to the first aspect, said binder material of the intermediate layer is selected from a bioresin, polyethylene (PE), polypropylene (PP) or PU. Preferably, the binder material is PU. The binder material serves to coat and strengthen the non-woven matt as well as binding to the PU coating of the top layer.

In an embodiment according to the first aspect, the bottom layer thickness is 1-5 mm, preferably 3 mm, and is 5-30 times greater than any of said first intermediate layer thickness or said top layer thickness; and said top layer thickness is 1.5-4 times greater than said first intermediate layer thickness. By using an intermediate layer thinner than the top layer, it has been found that the natural cooling properties of hemp are maintained, while at the same time it is possible to obtain a soft texture of the artificial leather. The thickness of the top layer is preferably 0.1-0.3 mm and the thickness of the intermediate layer is preferably 0.1-0.2 mm. Although the lower range for each layer is stated to be 0.1 mm, the condition of the thicknesses of both layers being different still applies. The intermediate layer is not an adhesive in the form of sprayable latex, polyalphaolefin or ethylene vinyl acetate, for which a visible discrete or distinct layer in the artificial leather is not formed.

In an embodiment according to the first aspect, said bottom layer has a fibre density of 150-350 g/m$^2$, preferably 180-300 g/m$^2$ in dry condition; said intermediate layer has a binder material density of 20-200 g/m$^2$, preferably 30-100 g/m$^2$ in dry condition; and said top layer has a density, preferably a PU density, of 30-200 g/m$^2$, preferably 40-150 g/m$^2$ in dry condition. This enables a uniform top layer while at the same time maintaining an adequate physical and bonding strength of the intermediate layer, without impairing the natural cooling properties of the hemp.

In an embodiment according to the first aspect, said bottom layer comprises:
65-90 wt % bast fibres having mean fibre length of 4-80 mm, preferably 10-30 mm,
0-5 wt % shives,
10-30 wt % of a cured resin, preferably a resin in fibre form, such as a bio-resin in fibre form,
where all the above sum up to 100 wt %.

As used herein, mean fibre length signifies mean fibre length by weight.

Since the bast fibres are impregnated with a polymer e.g. PU, the above weight percentage of the bast fibres includes the weight of such polymer. The entirety of the raw fibres used in the non-woven matt are bast fibres, e.g. hemp fibres; thus enabling the creation of a more bio-like artificial leather. The cured resin comprising 10-30 wt % is preferably from a resin provided in fibre form, more preferably from a bio-resin provided in fibre form, i.e. in the form of a melting fibre. Other resins having bi-component fibres such as polyethylene/polypropylene fibres, or polyester/polypropylene fibres may also be used. When mixed with the hemp fibres and cured, the bio-resin fibres and hemp fibres melt partly together thus sticking to each other as in a non-woven textile.

In a second aspect, the invention provides a process for producing an artificial leather having a laminated structure in the form of a plurality of discrete layers,
said plurality of layers comprising a bottom layer, an intermediate layer, and a top layer,
said bottom layer being a non-woven matt comprising bast fibres impregnated with a polymer for binding and colouring said bast fibres, and said bottom layer defining a bottom layer thickness,
said intermediate layer being a layer of a binder material, in which said intermediate layer is in direct connection with said bottom layer and in direct connection with said top layer for gluing with said top layer, and said intermediate layer defining an intermediate layer thickness,
said top layer being a polymer coating and defining a top layer thickness, and
wherein said bottom layer thickness is greater than any of said first intermediate layer thickness or said top layer thickness, and said first intermediate layer thickness is different from said top layer thickness,
the process comprising the following steps:
(a) forming a fibre layer by grinding a batch of raw bast fibres until reaching a mean fibre length of 2-100 mm, preferably 4-80 mm, and separating shives from said batch of raw bast fibres until reaching a content of 0-3 wt % of the fibre layer,
(b) adding to said fibre layer a resin in amount of 10-30 wt % of the fibre layer in an air-laying stage, curing said resin, and by pressing forming a raw non-woven matt,
(c) forming said non-woven matt comprising bast fibres impregnated with a polymer by passing said raw non-woven matt through a foulard bath of said polymer for impregnating the bast fibres,
(d) separately providing a releasable paper, applying thereon a polymer coating layer to form a combined releasable paper—polymer coating layer and then subjecting it to a drying step,
(e) applying a layer of binder material on the dry polymer coating layer of the combined releasable paper—polymer coating layer from step (d), subsequently laying on said layer of binder material, said non-woven matt comprising bast fibres impregnated with a polymer, and subjecting the thus combined releasable paper—polymer coating layer—layer of binder material, to a drying step, and subsequently subjecting the resulting dried product to a calendaring step, and
(f) removing the releasable paper from the product obtained in step (e).

In an embodiment according to the second aspect, said polymer coating of the top layer is selected acrylic or latex paints, PVC, polyethylene (PE), polypropylene (PP) or polyurethane (PU). Preferably, the polymer coating is PU. As mentioned above, the term polymer encompasses both polymers and copolymers, and the term latex means a suspension of polymer microparticles in water.

In an embodiment according to the second aspect, in step (e), the step of laying said non-woven matt comprising bast fibres impregnated with a polymer includes subjecting the matt to a calendaring step, preferably at 130-180° C., more preferably at 140-160° C. As the non-woven matt is rolled onto the, preferably wet, layer of binder material, it passes through a calendaring step prior to the drying step, thereby further ensuring the direct contact with said layer of binder material as well as evenness of the product. Further, in step (e), the final step of subjecting the resulting dried product to a calendaring step is conducted at 130-180° C., preferably at 140-160° C. Hence, after the drying step, a final calendaring step is conducted to provide the final attachment of the non-woven matt, binder material layer and polymer (e.g. PU) coating layer. In the final artificial leather, the non-woven matt becomes the bottom layer, the binder material layer becomes the intermediate layer and the PU coating layer, the top layer.

In another embodiment according to the second aspect, any of the calendaring steps in step (e) is conducted under a pressure of 3-6 bar, preferably 4 bar.

In an embodiment according to the second aspect, prior to step (a) or in connection with step (a), the process includes decortication of said raw bast fibres. Decortication means the crushing and knocking of the raw bast fibres contained in said batch of bast fibres. The batch is preferably provided as a bale of raw bast fibres. Typically, the raw fibres are also subjected to a degumming step, in which the fibres are separated as much as possible by removing "gum" which causes the raw fibres to stick together. This is normally done by cleaning the raw fibres in an aqueous solution of KOH or NaOH. By the present invention, it has been found that such degumming step may be omitted In an embodiment according to the second aspect, step (b) includes curing the resin in a curing oven at 130-200° C., preferably 170-180° C., more preferably 175° C., and step (b) further includes after curing said resin, pressing the raw non-woven matt until reaching a fibre density of 150-400 g/m2, preferably 180-300 g/m2 in dry condition. As described above, the resin is preferably a bio-resin, such as bio-resin in fibre form, i.e. in the form of a melting fibre. Resins include bi-component fibres such as polyethylene/polypropylene fibres, or polyester/polypropylene fibres.

When mixed with the hemp fibres and cured, the bio-resin fibres and hemp fibres melt partly together thus sticking to each other as in a non-woven textile.

The pressing after curing enables the compacting of the material to the above fibre density, while the air laying gives the evenness and fineness to the non-woven matt. The non-woven matt has a thickness of 1-5 mm and is then preferably wound into a roll 1-2 m. wide for subsequent processing steps.

In an embodiment according to the second aspect, in step (c) said polymer for impregnating the bast fibres is preferably polyurethane (PU) and step (c) includes, after said foulard bath, a calendaring step for removing excess PU. The non-woven matt may thus be compacted to remove excess PU while at the same time achieving an even surface, so that subsequent coating layer can properly bond to the surface of the non-woven matt.

In an embodiment according to the second aspect, in step (d) the releasable paper is first coated with a PU coating layer to a thickness of 0.1-0.3 mm; while in step (e) the layer of binder material is applied to a thickness of 0.1-0.3 mm, such as 0.1-0.2 mm. Although the lower range may be the same (0.1 mm), the condition of the thicknesses of both layers being different still applies.

In an embodiment according to the second aspect, in step (d) the polymer coating layer being applied is a wet polymer coating layer, and in step (e) the layer of binder material being applied is a wet layer of binder material and said non-woven matt comprising bast fibres impregnated with polymer is laid on said wet layer of binder material. The binder material is preferably PU.

Normally, additional finishing steps will be required, including pressing and embossing the product from step (f). The pressing and embossing enables further softening of the hemp fibres while also graining of the artificial leather to even more resemble the texture and appearance of natural or synthetic leather. However, by the present invention such pressing and embossing steps are no longer needed because the effect of embossing is already provided by the coating on the paper described above.

In a third aspect of the invention, there is also provided an article in the form of clothing, furniture, shoes, purses, bags, luggage and lining comprising an artificial leather according to any of the above or below embodiments.

In a fourth aspect of the invention, the invention encompasses also the use of the artificial leather according to any of the above or below embodiments in the manufacturing of clothing, furniture, shoes, purses, bags, luggage and linings.

Any of the features of the embodiments of the first aspect may be combined with any of the features of the embodiments of the second or third or fourth aspect.

Figure 2:
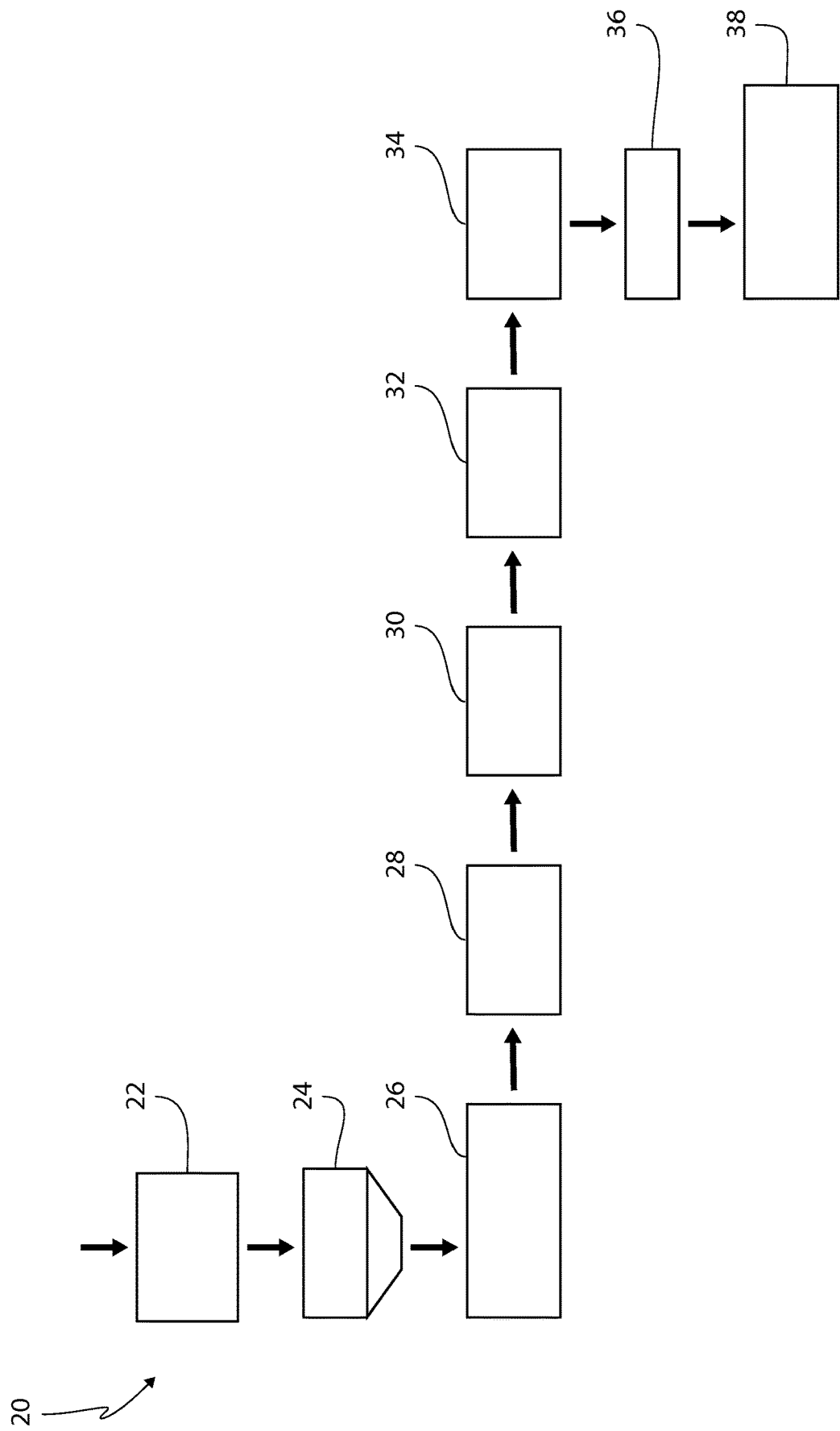
Figure 3A:
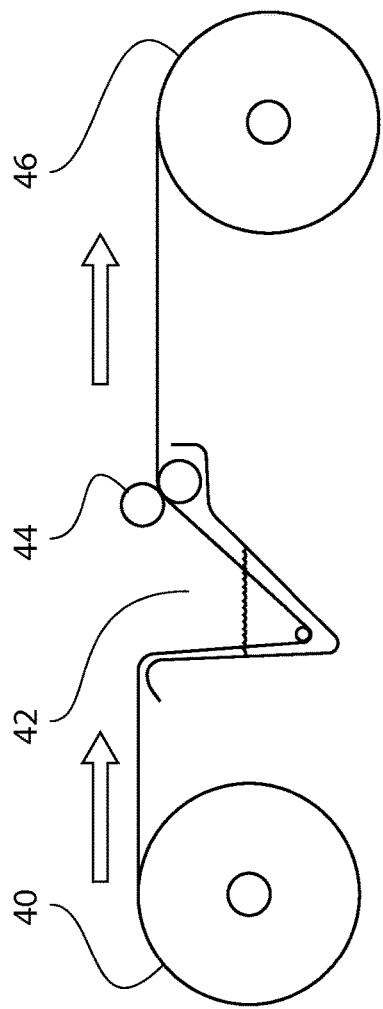
Figure 3B:
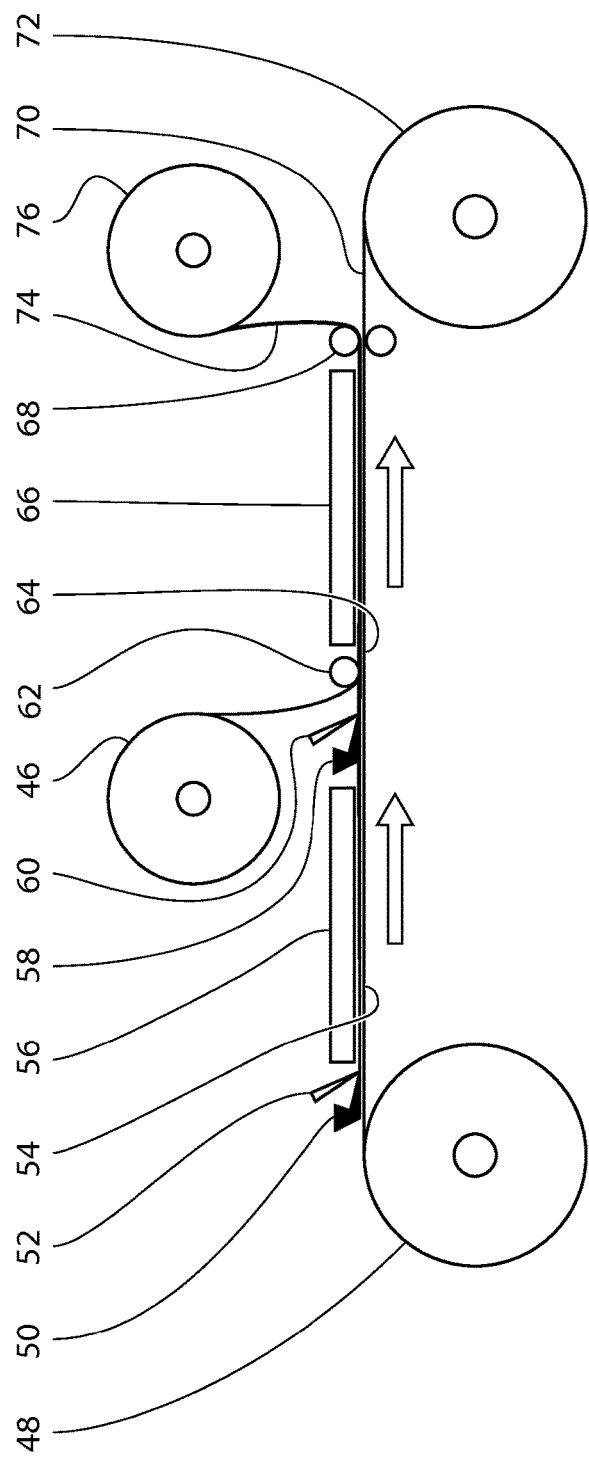

The invention will now be further described by the accompanying figures, in which FIG. 1 illustrates an artificial leather according to the first aspect of the invention, FIG. 2 is an overall process scheme for the producing the artificial leather of FIG. 1, FIG. 3a and FIG. 3b are detailed representations of the coating step of the non-woven matt. In particular, FIG. 3a is a more detailed representation of the impregnation Foulard and calendaring of the non-woven matt, and FIG. 3b is more detailed representation of the subsequent coating of the intermediate and top layer of the non-woven matt.

FIG. 1. shows a schematic representation of an artificial leather 10 according to the first aspect of the invention having a laminated structure by having three discrete layers, i.e. three distinct or separate layers. Bottom layer 12 is the non-woven matt of bast fibres, e.g. hemp fibres, impregnated with a polymer and having a thickness of 1-5 mm. Intermediate layer 14 is in the form of a binder material such as PU having a thickness of 0.2 mm and which is in direct connection with the bottom layer, i.e. substrate layer, and also with the top layer 16 of a polymer coating, preferably PU, having a thickness of 0.3 mm and which provides for the structure and appearance of the artificial leather, so it resembles synthetic leather.

FIG. 2 shows an overall process 20 for the manufacturing of the artificial leather in which raw bast fibres, in particular raw hemp fibres are delivered in batches such as bales by a fibre supplier. The raw hemp fibres are subjected to decortication 22 and optionally degumming, followed by a fining step 24 for separation of shives from the fibres. Shives are clusters of splinters of raw hemp fibres which are normally undesirable to carry through the overall process. This results in fibres having a mean fibre length of 4-80 mm and 0-3 wt % shives. The fibres are deposited on a conveyor band, thus forming a fibre layer. Then a resin, preferably a bio-resin in fibre form, i.e. in the form of a melting fibre, is mixed with the fibre layer in mixing step 26. This is done by adding the resin on top of the fibre layer on a conveyor band in a 15/85 or 20/85 weight ratio of resin to fibres. A conventional air-laying stage 28 enables the complete physical mixture of the resin with the fibres, and allows the resulting mixture to gently fall on a band, thereafter curing the resin in a curing oven (not shown) at 130-200° C., such as 175° C. The residence time in the oven is readily adapted to the circumstances, but typically a residence time of 0.5-1.5 min. suffices. The resulting non-woven matt is in step 30 compacted by pressing, giving a non-woven matt of 1-5 mm thickness which is wound into a roll having a fibre density of 150-350 $g/m^2$, such as 180 $g/m^2$ in dry condition. This non-woven matt of hemp fibres is the substrate on top of which discrete intermediate and top layers are coated. Coating step 32 includes the impregnation of the hemp fibres and the subsequent coating (casting coating) of the non-woven matt of impregnated fibres; see description of FIGS. 3a and 3b below. After coating the intermediate and top layer on the non-woven matt, the artificial leather is further subjected to an optional step 34 of pressing and embossment in order to further promote the conventional synthetic leather structure, and which may further be effected by an optional finishing step or process 36 where the artificial leather is treated with conventional leather finishing formulations, e.g. for water repelling. The artificial leather is then rolled in step 38 into a finished roll of hemp (bio) leather, or simply artificial leather.

FIG. 3*a* represents the first step of step 32 of FIG. 2. FIG. 3*a* shows the substrate or raw non-woven matt of hemp fibres 40 produced in step 30. The raw non-woven matt 40 is coloured in Foulard bath 42. For the colouring, the fibres are impregnated with a polymer, here PU, thus providing later the resulting bottom layer 12 of the artificial leather 10 (FIG. 1). After impregnation, the non-woven matt goes through a calendaring step 44 which presses the excess polymer of the impregnation out of the non-woven matt, while at the same time providing an even surface on the coloured or impregnated non-woven matt 46 roll so that subsequent coating is possible.

FIG. 3*b* represents the second step of step 32 of FIG. 2. FIG. 3*b* shows separately providing a film of releasable paper from roll 48. A wet PU coating layer 50 is applied up to a thickness of 0.3 mm, for instance by knife-coating 52, thus forming a combined releasable paper—PU coating layer 54 which is then subjected to drying at 160° C. in oven 56. Thereafter, a layer of wet binder material 58 such as PU is applied up to a thickness of 0.2 mm, for instance by knife-coating 60 on the dried PU coating layer of the above combined releasable paper—PU coating layer 54. Subsequently the non-woven mat 46 comprising bast fibres impregnated with a polymer as described in connection with FIG. 3*a*, is laid thereon via a calendaring step 62 conducted at 130-180° C., preferably 160° C. The combined releasable paper—PU coating layer—layer of binder material 64 is then subjected to and additional drying step in oven 66 and an additional calendaring step 68 is finally conducted at 130-180° C., preferably 160° C. It is thus apparent, that the intermediate product 64 contains at the bottom a releasable paper 70, followed by a PU layer up to 0.3 mm thick which corresponds to the top layer 16 of FIG. 1, then a layer of binder material up to 0.2 mm thick which corresponds to the intermediate layer 14 of FIG. 1, and a non-woven matt comprising bast fibres impregnated with a polymer which corresponds to bottom layer 12 in FIG. 1. Finally, releasable paper 70 is removed and wound up in a separate roll 72, while the separated artificial leather 74 is wound up as roll 76 of artificial leather 10 (FIG. 1). As the releasable paper is removed, a leather like structure is left behind on the top layer, as well as any other desirable structure or appearance, such as a natural structure or custom-made.

The invention claimed is:

1. An artificial leather (10) having a laminated structure in the form of a plurality of discrete layers,
    said plurality of discrete layers consisting of a bottom layer (12), an intermediate layer (14), and a top layer (16),
    said bottom layer (12) being a non-woven matt comprising bast fibres and being free from synthetic fibres, said non-woven matt being impregnated with a polymer for binding and colouring said bast fibres, and said bottom layer (12) defining a bottom layer thickness,
    said intermediate layer (14) being a layer of a binder material, in which said intermediate layer (14) is in direct connection with said bottom layer (12) and in direct connection with said top layer (16) for gluing with said top layer (16), and said intermediate layer (14) defining an intermediate layer thickness,
    said top layer (16) being a polymer coating and defining a top layer thickness, and
    wherein said bottom layer thickness is greater than any of said intermediate layer thickness or said top layer thickness and said intermediate layer thickness is thinner than said top layer thickness.

2. An artificial leather according to claim 1, wherein said polymer coating of the top layer (16) is selected acrylic or latex paints, PVC, polyethylene (PE), polypropylene (PP) or polyurethane (PU).

3. An artificial leather according to claim 1, wherein said bast fibres of said bottom layer (12) are hemp fibres, wherein the polymer impregnating the hemp fibre matt is a polymer selected from polyester or PU.

4. An artificial leather according to claim 1, wherein said binder material of the intermediate layer (14) is selected from a bio-resin, polyethylene (PE), polypropylene (PP) or PU.

5. An artificial leather according to claim 1, wherein the bottom layer thickness is 1-5 mm, and is 5-30 times greater than any of said intermediate layer thickness or said top layer thickness, and wherein said top layer thickness is 1.5-4 times greater than said intermediate layer thickness.

6. An artificial leather according to claim 1, wherein:
    said bottom layer (12) has a fibre density of 150-350 g/m$^2$ in dry condition, or a fibre density of 300-600 g/m$^2$ in dry condition,
    said intermediate layer (14) has a binder material density of 20-200 g/m$^2$ in dry condition, and
    said top layer has polymer density of 30-200 g/m$^2$ in dry condition.

7. An artificial leather according to claim 1, wherein said bottom layer (12) comprises:
    95-100 wt % bast fibres impregnated with the polymer and having mean fibre length of 4-80 mm,
    0-5 wt % shives,
    where the above sum up to 100 wt %.

8. Process for producing an artificial leather having a laminated structure in the form of a plurality of discrete layers,
    said plurality of discrete layers consisting of a bottom layer, an intermediate layer, and a top layer,
    said bottom layer being a non-woven matt comprising bast fibres and being free from synthetic fibres, said non-woven matt being impregnated with a polymer for binding and colouring said bast fibres, and said bottom layer defining a bottom layer thickness,
    said intermediate layer being a layer of a binder material, in which said intermediate layer is in direct connection with said bottom layer and in direct connection with said top layer for gluing with said top layer, and said intermediate layer defining an intermediate layer thickness,
    said top layer being a polymer coating and defining a top layer thickness, and
    wherein said bottom layer thickness is greater than any of said intermediate layer thickness or said top layer thickness, and said intermediate layer thickness is thinner than said top layer thickness,
    the process comprising the following steps:
    (a) forming a fibre layer by grinding a batch of raw bast fibres until reaching a mean fibre length of 2-100 mm, and separating shives from said batch of raw bast fibres until reaching a content of 0-3 wt % of the fibre layer,
    or
    (b) carding a plurality of said fibre layers and cross-lapping for forming a cross-lapped multilayer arrangement, needle-punching said cross-lapped multilayer arrangement, and by rolling forming a raw non-woven matt, (c) forming said non-woven matt comprising bast fibres impregnated with a polymer by passing said raw non-woven matt through a foulard bath of said polymer for impregnating the bast fibres, (d) separately providing a releasable paper, applying thereon a polymer coating layer to form a combined releasable paper—polymer coating layer and then subjecting it to a drying step, (e) applying a layer of binder material on the dry polymer coating layer of the combined releasable paper—polymer coating layer from step (d), subsequently laying on said layer of binder material, said non-woven matt comprising bast fibres impregnated with a polymer, and subjecting the thus combined releasable paper—polymer coating layer—layer of binder material, to a drying step, and subsequently subjecting the resulting dried product to a calendaring step, and (f) removing the releasable paper from the product obtained in step (e).

9. Process according to claim 8, wherein said polymer coating of the top layer is selected acrylic or latex paints, PVC, polyethylene (PE), polypropylene (PP) or polyurethane (PU).

10. Process according to claim 8, wherein in step (e), the step of laying said non-woven matt comprising bast fibres impregnated with a polymer includes subjecting the matt to a calendaring step at 130-180° C., and wherein in step (e) the final step of subjecting the resulting dried product to a calendaring step is conducted at 130-180° C.

11. Process according to claim 8, wherein any of the calendaring steps in step (e) is conducted under a pressure of 3-6 bar.

12. Process according to claim 8, wherein in step (c) said polymer for impregnating the bast fibres is polyurethane (PU) and step (c) includes, after said foulard bath, a calendaring step for removing excess PU, and optionally also a drying step.

13. An article in the form of clothing, furniture, shoes, purses, bags, luggage and linings, said article comprising an artificial leather according to claim 1.

14. A method of manufacturing an article, said method comprising utilizing an artificial leather according to claim 1 in producing the article, wherein the article is clothing, furniture, shoes, purses, bags, luggage, or linings.

15. A method of manufacturing an article, said method comprising producing an artificial leather according to claim 8, and utilizing said artificial leather in producing the article, wherein the article is clothing, furniture, shoes, purses, bags, luggage, or linings.

* * * * *